(12) United States Patent
Natarajan

(10) Patent No.: US 9,565,243 B2
(45) Date of Patent: Feb. 7, 2017

(54) SYSTEM AND METHOD FOR MANAGING EVENT TRACKING

(71) Applicant: NetApp, Inc., Sunnyvale, CA (US)

(72) Inventor: Srikumar Natarajan, Cary, NC (US)

(73) Assignee: NETAPP, INC., Sunnyvale, CA (US)

( * ) Notice: Subject to any disclaimer, the term of this patent is extended or adjusted under 35 U.S.C. 154(b) by 619 days.

(21) Appl. No.: 13/945,836

(22) Filed: Jul. 18, 2013

(65) Prior Publication Data

US 2015/0026238 A1 Jan. 22, 2015

(51) Int. Cl.
*G06F 15/16* (2006.01)
*H04L 29/08* (2006.01)
*G06F 11/34* (2006.01)
*G06F 11/07* (2006.01)
*G06F 11/30* (2006.01)

(52) U.S. Cl.
CPC ........... *H04L 67/10* (2013.01); *G06F 11/0706* (2013.01); *G06F 11/3006* (2013.01); *G06F 11/3476* (2013.01); *G06F 11/3495* (2013.01); *G06F 2201/86* (2013.01)

(58) Field of Classification Search
CPC .. H04L 67/10; G06F 11/0706; G06F 11/3006; G06F 11/3476; G06F 11/3495; G06F 2201/86
USPC ........................................................ 709/203
See application file for complete search history.

(56) References Cited

U.S. PATENT DOCUMENTS

| | | | |
|---|---|---|---|
| 5,517,655 A | | 5/1996 | Collins et al. |
| 8,239,229 B1 * | | 8/2012 | Paiz ..................... G06Q 10/083 705/7.11 |
| 2003/0187872 A1 * | | 10/2003 | Gray ....................... G06F 17/30 |
| 2005/0028171 A1 | | 2/2005 | Kougiouris et al. |
| 2005/0033777 A1 * | | 2/2005 | Moraes ............. G06F 17/30575 |
| 2006/0248310 A1 * | | 11/2006 | Kavalam ............. G06F 11/3485 712/11 |

(Continued)

OTHER PUBLICATIONS

Patent Cooperation Treaty—International Searching Authority—US, PCT Notification of Transmittal of the International Search Report and the Written Opinion of the International Searching Authority , or the Declaration, Application No. PCT/US2014/047070, mailed Dec. 18, 2014, 9 pages, Alexandria, Virginia.

*Primary Examiner* — Hitesh Patel

(74) *Attorney, Agent, or Firm* — Nixon Peabody LLP; Khaled Shami

(57) ABSTRACT

A system and method of managing event tracking includes a tracking registry. The tracking registry includes a memory for storing tracking entries, a tracking entry hierarchy, and a registry interface configured to receive requests from a plurality of modules. The tracking registry opens a tracking entry based on a registry request received from a first module of the plurality of modules, and being associated with a first operation being handled by the first module and including a parent identifier of a parent tracking entry of the tracking entry, updates the tracking entry hierarchy based on the parent identifier, stores the first tracking entry in the memory, and closes the tracking entry based on an entry closing request received from a second module of the plurality of modules and being associated with completion of a second operation being handled by the second module. The second operation performs processing associated with completion of the first operation.

26 Claims, 6 Drawing Sheets

(56) References Cited

U.S. PATENT DOCUMENTS

| | | | |
|---|---|---|---|
| 2008/0313486 A1* | 12/2008 | Parfitt | G05B 19/054 |
| | | | 713/600 |
| 2010/0262948 A1* | 10/2010 | Melski | G06F 8/71 |
| | | | 717/101 |
| 2012/0005542 A1* | 1/2012 | Petersen | G06F 11/0709 |
| | | | 714/48 |
| 2012/0226667 A1 | 9/2012 | Volvovski et al. | |

* cited by examiner

500

| Field | Description |
|---|---|
| ID | Tracking entry identifier |
| open_time | Time stamp when the entry is opened |
| close_time | Time stamp when the entry is closed |
| expected_close_time | Time when the entry is expected to close |
| type | Tracking entry type |
| module | Identifier of module opening the entry |
| parent | Identifier of a parent of the entry |
| children | Identifier of children of the entry |
| name | Description/name for the entry |
| state | State of the entry |

505 — ID
510 — open_time
515 — close_time
520 — expected_close_time
525 — type
530 — module
535 — parent
540 — children
545 — name
550 — state

FIG. 5

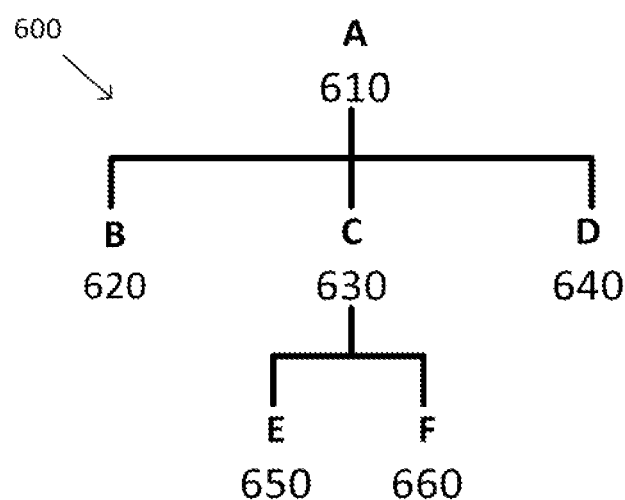

FIG. 6

SYSTEM AND METHOD FOR MANAGING EVENT TRACKING

TECHNICAL FIELD

The present disclosure relates generally to computing systems, and more particularly to managing event tracking.

BACKGROUND

As computing solutions become more distributed in nature, it often becomes quite challenging to monitor whether all the events that occur are being properly handled. Each event typically begins with an initial stimulus, which triggers further processing and operations for handling the events, and continues until a terminal condition occurs. Examples of initial stimuli include fault conditions and requests for service. Fault conditions may include disk drive failures, over temperature conditions, etc. Requests for service may include input/output (I/O) requests, backup requests, recovery requests, replication, etc. When the further processing and operations used to handle the event is delegated to separate modules, it may not be easy to determine whether the terminal condition occurs, thus indicating that the event has been fully and completely handled. Additionally, it may be even more challenging to determine which of the many modules was unable to complete the further processing as requested.

Failure to reach the terminal condition may come from any of several sources. In some instances, the design of one or more of the modules may be faulty and result in an incomplete or defective state machine design. Failures may also occur when messages sent between the modules may be lost and/or corrupted. Deadlock conditions may occur where two or more modules are waiting on each other to finish some processing before proceeding. Additionally, one or more of the modules may include defects that result in a failure.

Accordingly, it would be desirable to provide improved methods and systems for managing the handling and tracking of events in a computing system.

BRIEF DESCRIPTION OF THE DRAWINGS

FIG. 5 is a simplified diagram of an example tracking entry according to some embodiments.

FIG. 6 is a simplified diagram of an example tracking entry hierarchy associated with the event tracking of FIG. 3 according to some embodiments.

Figure 1:
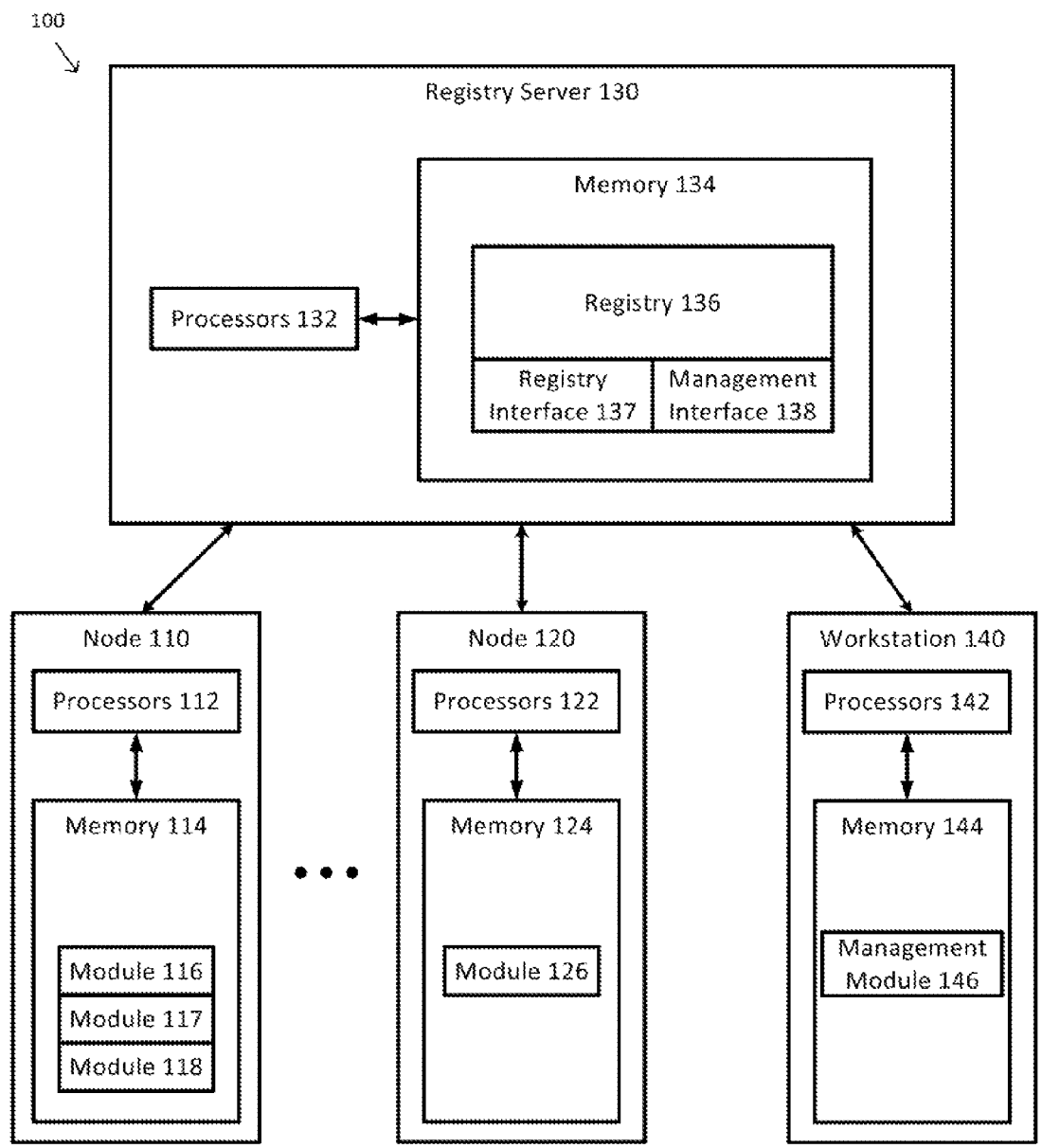
FIG. 1 is a simplified diagram of an example computing system according to some embodiments.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In order to detect and locate failures that prevent the terminal condition associated with various events from being reached, software and hardware developers may often rely on tracing and related techniques. These techniques may involve periodically sending messages to a log, incrementing and/or updating status variables, and the like. Depending upon the implementation, these techniques are often limited to a single module, or at best to a single node in a cluster or other multi-device computing system. These techniques are often limited in nature and in most implementations may not support the ability to record inter-dependencies between related events, their initial stimuli, and their terminal conditions. Consequently, a tracking system for events may provide improved methods to detect when terminal conditions for events are not reached.

Such a tracking system may be based around one or more tracking registries. The tracking registries are implemented separately from the modules and in some instances may even be located in one or more servers that are independent of the nodes where the modules are located. Each of the modules implementing the processing and operations for the handling of events may register one or more events with a tracking registry. Once registered, a corresponding open entry is created in the registry. When the corresponding terminal condition is reached, a module may notify the tracking registry that the open entry should be closed indicating that the event is fully handled. The registry is flexible enough so that the entry may be closed by the module that registered the event or by a different module that completed the last step in the processing for handling the event. By examining the open entries in the registry, a developer or a monitoring system may determine which of the registered events are not fully handled and for which the terminal condition is not yet satisfied.

By separating the tracking registries from the modules, various advantages are possible. For example, separate tracking registries support design strategies, such as abstraction and encapsulation. In some examples, the modules may know little about the registries except how to register and close events. Further, use of separate tracking registries may reduce congestion and/or contention between the many modules that may be using the tracking registries as different tracking registries may be used to track different types of events and/or events from subsets of the modules and/or the nodes in the computing system. The separate registries may also facilitate more efficient use of computing resources as the registries may be implemented to optimize one or more of memory, speed, and the like as necessary based on where they are implemented in the computing system.

The registry may further be improved by adding a time stamp to the open entry indicating when the entry was registered. This may allow the developer or the monitoring system to distinguish between open entries for events that should already be closed from those for which ongoing processing is expected. The registry may also include tracking data for determining the type of a registered event, the module that registered the event, and even interrelationships between the registered events.

The tracking registries may further support one or more management interfaces that may be useful to a developer and/or a monitoring system. For example, the management interfaces may support the ability to query the registry to determine which events have open entries and how long those entries have been open. The ability to query the resister may also support identifying entries based on the event type, the registering module, and/or any other tracking data associated with the event. Other features of the management interfaces may include the ability to extract open entries in a useful format, clear open entries from the registry, and the like.

FIG. 1 is a simplified diagram of an example computing system 100 according to some embodiments. As shown in FIG. 1, computing system 100 includes nodes 110 and 120. Although nodes 110 and 120 are shown as independent computing devices, nodes 110 and 120 may be part of a cluster or any other distributed computing architecture. Further, even though computing system 100 is shown with only two nodes, computing system 100 may include any number of nodes.

Node 110 includes one or more processors 112 and memory 114. The one or more processors 112 are coupled to memory 114. In some examples, the one or more processors 112 may control operation and/or execution of software modules on node 110. Memory 114 may be used to store any number of software modules. Memory 114 may further be used to store the software modules while the software modules are executing. As shown in FIG. 1, memory 114 is storing software modules 116-118 as they are being executed on node 110. Although node 110 is shown with three software modules being executed, any number of software modules may be executed on node 110 as long as node 110 includes sufficient computing resources to handle them. In some examples, each of the software modules 116-118 may represent a thread, a process, an application, and/or the like. In some examples, each of the software modules 116-118 may be executing in separate virtual environments and/or guest operating systems on node 110.

Node 120 includes one or more processors 122 and memory 124, which are configured and operate similarly to processors 112 and memory 114 (described above). As shown in FIG. 1, memory 124 is storing software module 126 as it is being executed on node 120. Although node 120 is shown with one software module being executed, any number of software modules may be executed on node 120 as long as node 120 includes sufficient computing resources to handle them. In some examples, software module 126 may represent a thread, a process, an application, and/or the like. In some examples, software module 126 may be executing in a virtual environment and/or a guest operating system on node 120.

Each of the software modules 116-118 and 126 of computing system 100 may be working cooperatively together to process requests and/or handle events. As an example, as software module 116 processes a request or handles an event, software module 116 may delegate some of the processing and operations to one or more of the other software modules 117, 118, and/or 126. Software module 116 may do this by making a function call, transmitting messages, invoking a remote procedure call, and the like.

Computing system 100 further includes a registry server 130. Registry server 130 includes one or more processors 132 and memory 134. The one or more processors 132 are coupled to memory 134. In some examples, the one or more processors 132 may control operation and/or execution of registry server 130. Memory 134 may be used to store a tracking registry 136 while tracking registry 136 is executing. In some examples, tracking registry 136 may be executing in a virtual environment and/or a guest operating system on registry server 130.

Registry 136 includes a registry interface 137 and a management interface 138. Registry interface 137 may be used by any of the software modules 116-118 and/or 126 to register events with tracking registry 136 and to create corresponding tracking entries and mark them as open. Registry interface 137 may be used by any of the software modules 116-118 and/or 126 to close tracking entries previously registered with tracking registry 136. In some examples, registry interface 137 may be implemented using one or more application program interfaces (APIs). In some examples, registry interface 137 may be implemented using remote procedure calls and/or other message passing mechanisms. Management interface 138 may be used by a developer and/or a monitoring system to manage and/or query tracking registry 138. In some examples, management interface 138 may be used to query tracking registry 136 to identify open tracking entries. Management interface 138 may use any fields and/or data associated with each of the tracking entries to identify any suitable subset of the tracking entries based on a corresponding search request. Management interface 138 may include the ability to extract tracking entries in a useful format, clear tracking entries from the registry, and the like. Management interface 138 may also include support for APIs, remote procedure calls, web services, other message passing mechanisms, command line interfaces (CLIs), web interfaces, and the like. In some examples, registry interface 137 and management interface 138 may be combined into a single interface.

Computing system 100 further includes a workstation 140. Workstation 140 may be used by a software developer and/or an operator to manage, monitor, and/or debug the modules executing on nodes 110 and 120 by using tracking registry 136. Although workstation 140 is shown as a stand-alone unit, other configurations for workstation 140 are possible. In some examples, workstation 140 may be one of the nodes 110 and/or 120 and/or registry server 130. Workstation 140 includes one or more processors 142 and memory 144. The one or more processors 142 are coupled to memory 144. In some examples, the one or more processors 142 may control operation and/or execution of software components on workstation 140. Memory 144 may be used to store any number of software components while the software components are executing. As shown in FIG. 1, memory 144 is storing a management module 146 as it is being executed on workstation 140, where management module 146 may facilitate the querying and management of tracking registry 136 using management interface 138. In some examples, management module 146 may be executing in a virtual environment and/or a guest operating system on workstation 140.

In some examples, nodes 110 and 120, registry server 130, and/or workstation 140 may be coupled together using a network (not shown). Thus, nodes 110 and 120 may use the network to support any number of cooperating software modules. The software modules being executed on nodes 110 and 120 may exchange messages and/or data using the network. The software modules being executed on nodes 110 and 120 may further use the network to register and close tracking entries using registry interface 137 of tracking registry 136. Workstation 140 may further use the network to query and/or manage tracking registry 136 using management interface 138. The network may include any kind of network technology. For instance, the network may include any number of network switching devices and may include an autonomous system. In some examples, the network may include a Wide Area Network (WAN), such as the Internet, a Local Area Network, such as an Ethernet, and/or a combination thereof.

Memories 114, 124, 134, and/or 144 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 2:
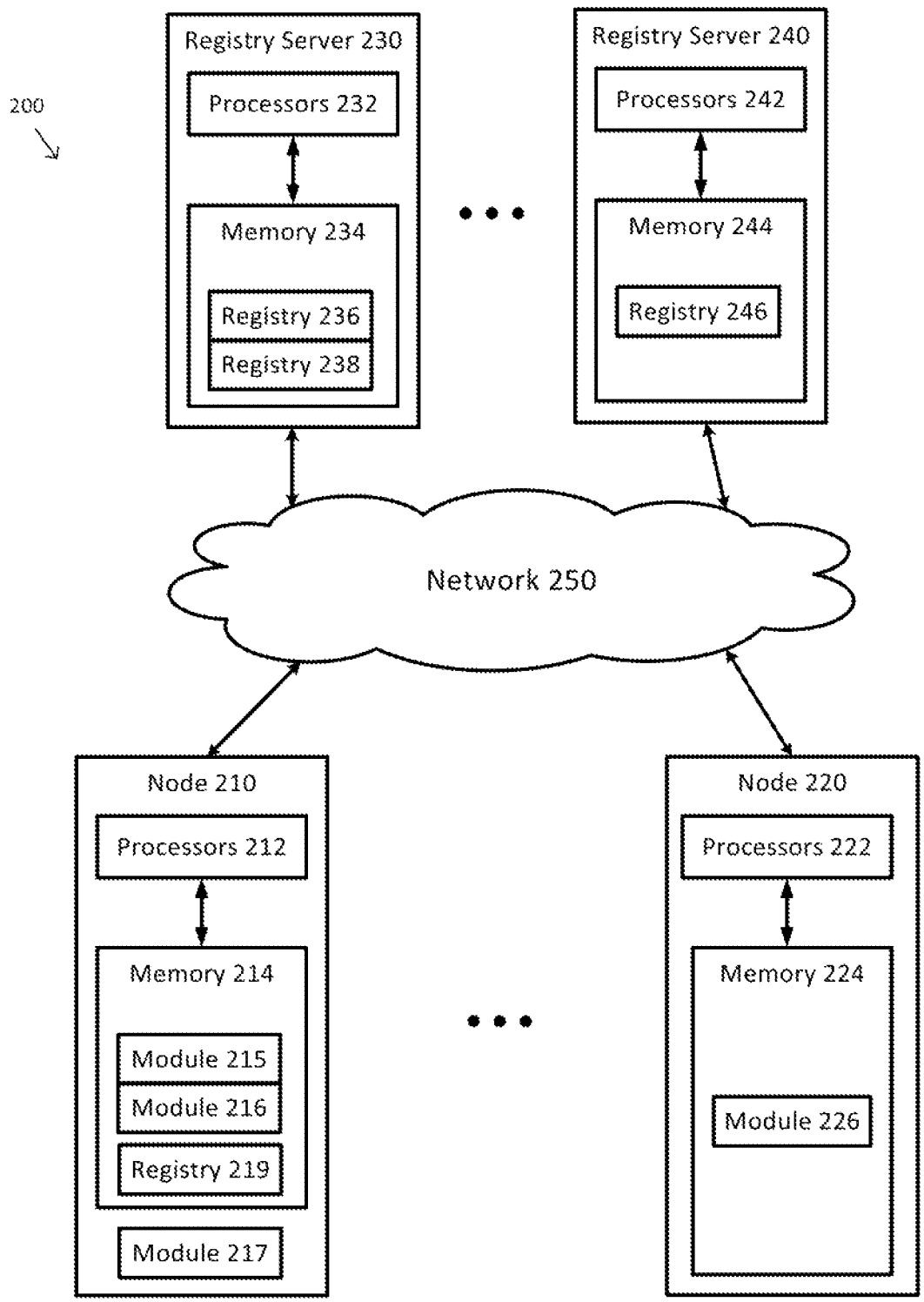
FIG. 2 is a simplified diagram of an example computing system according to some embodiments.

FIG. 2 is a simplified diagram of an example computing system 200 according to some embodiments. As shown in FIG. 2, computing system 200 includes nodes 210 and 220. In some examples, nodes 210 and/or 220 may be similar to nodes 110 and/or 120. Although computing system 200 is shown with only two nodes, computing system 200 may include any number of nodes.

Node 210 includes one or more processors 212 and memory 214. The one or more processors 212 are coupled to memory 214. In some examples, the one or more processors 212 may control operation and/or execution of modules on node 210. Memory 214 may be used to store any number of software modules. Memory 214 may further be used to store the software modules while the software modules are executing. As shown in FIG. 2, memory 214 is storing software modules 215 and 216 as they are being executed on node 210. Although node 210 is shown with two software modules being executed, any number of software modules may be executed on node 210 as long as node 210 includes sufficient computing resources to handle them. In some examples, each of the software modules 215 and 216 may represent a thread, a process, an application, and/or the like. Memory 214 may further be used to store a tracking registry 219. In some examples, tracking registry 219 may be similar to tracking registry 136. In some examples, each of the software modules 215 and 216 and tracking registry 219 may be executing in separate virtual environments and/or guest operating systems on node 210. In some examples, tracking registry 219 may be functionality or a service provided by an operating system, a host operating system, or a hypervisor. Node 210 further includes a hardware module 217. In some examples, hardware module 217 may be a DMA unit and/or other hardware device that may provide computing capability with little or no software. Although node 210 is shown with one hardware module, any number of hardware modules may be included in node 210.

Node 220 includes one or more processors 222 and memory 224 that are configured similarly to, and operate similarly to, processors 212 and memory 214. As shown in FIG. 2, memory 224 is storing software module 226 as it is being executed on node 220. Although node 220 is shown with one software module being executed, any number of software modules may be executed on node 220 as long as node 220 includes sufficient computing resources to handle them. In some examples, software module 226 may represent a thread, a process, an application, and/or the like and may be executing in a virtual environment and/or a guest operating system on node 220.

Each of the software modules 215, 216, and 226 and hardware module 217 of computing system 200 may be working cooperatively together to process requests and/or handle events. As an example, as software module 216 processes a request or handles an event, software module 216 may delegate some of the processing to one or more of the other software modules 215 and/or 226 and/or hardware module 217. Software module 216 may do this by making a function call, transmitting messages, invoking a remote procedure call, initiating I/O operations, and the like.

In addition to tracking registry 219, computing system 200 further includes registry servers 230 and 240. Registry server 230 includes one or more processors 232 and memory 234. The one or more processors 232 are coupled to memory 234. In some examples, the one or more processors 232 may control operation and/or execution of registry server 230. Memory 234 may be used to store tracking registries 236 and 238. Memory 234 may further be used to store tracking registries 236 and 238 while tracking registries 236 and 238 are executing. In some examples, tracking registries 236 and/or 238 may be similar to tracking registries 136 and/or 219. In some examples, tracking registries 236 and 238 may each be executing in separate virtual environments and/or separate guest operating systems on registry server 230. In some examples, tracking registries 236 and 238 may each be functionality or a service provided by an operating system, a host operating system, or a hypervisor.

Registry server 240 includes one or more processors 242 and memory 244 that are configured similarly to, and operate similarly to, processors 232 and memory 234. Memory 244 may be used to store tracking registry 246. Memory 244 may further be used to store tracking registry 246 while tracking registry 246 is executing. Tracking registry 246 may be similar to tracking registries 136, 219, 236, and/or 238 and may be executing in a virtual environment and/or a guest operating system on registry server 240. In some examples, tracking registry 246 may be functionality or a service provided by an operating system, a host operating system, or a hypervisor.

Software modules 215, 216, and/or 226 and/or hardware module 217 may use any of the tracking registries 219, 236, 238, and/or 246 to register and/or close tracking entries for tracking entries of different types. In some examples, the tracking registries 219, 236, 238, and/or 246 may provide redundancy.

Computing system 200 further includes a network 250. Nodes 210 and 220 and registry servers 230 and 240 are coupled together using network 250. Nodes 210 and 220 may use network 250 to support any number of cooperating software and hardware modules. The software and hardware modules of nodes 210 and 220 may exchange messages and/or data using network 250. The software and hardware modules of nodes 210 and 220 may further use network 250 to register and close tracking entries using a registry interface of any of the tracking registries 219, 236, 238, and/or 246. In some examples, a workstation (not shown) may further use network 250 to query and/or manage any of the tracking registries 219, 236, 238, and/or 246 using corresponding management interfaces. Network 250 may be any kind of network. In some examples, network 250 may be an Ethernet. In some examples, network 250 may include any number of network switching devices. In some examples, network 250 may be an autonomous system. In some examples, network 250 may be an Internet.

Memories 214, 224, 234, and/or 244 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As discussed above and further emphasized here, FIGS. 1 and 2 are merely examples which should not unduly limit the scope of the claims. One of ordinary skill in the art would recognize many variations, alternatives, and modifications. In some embodiments, other combinations and arrangements of the nodes 110, 120, 210, and/or 220, the registration servers 130, 230, and/or 240, the software modules 116-118, 126, 215, 216, and/or 226, the hardware module 217, the tracking registries 136, 219, 236, and/or 246, workstation 140, and/or network 250 are possible. In some examples, additional nodes, registration servers, software modules, hardware modules, workstations, and networks may be present in a computing system. In some examples, each of the registration servers, software modules, and hardware modules may be located in the same node or potentially even the same virtual machine.

Figure 3:
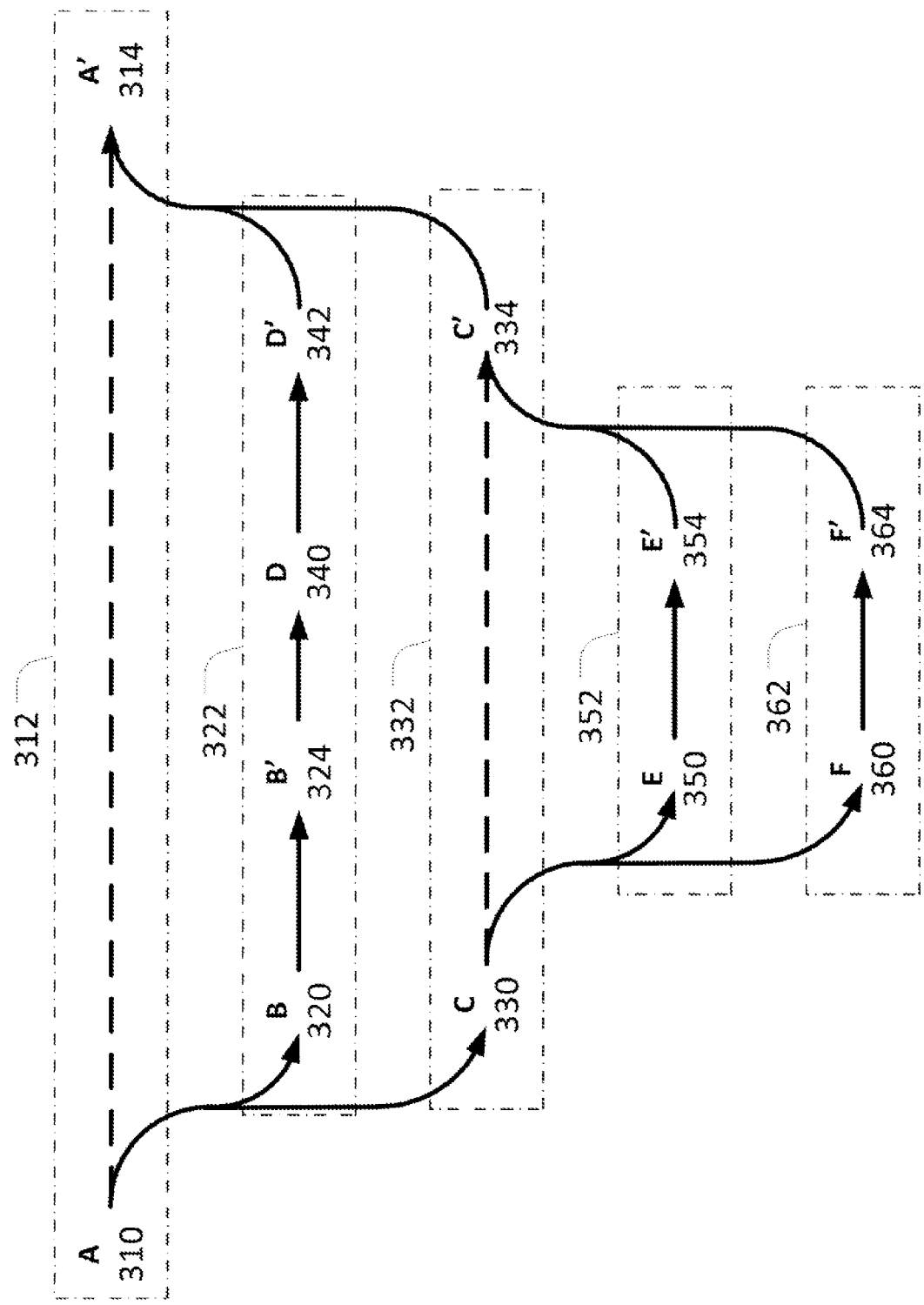
FIG. 3 is a simplified diagram of an example event tracking process according to some embodiments.

FIG. 3 is a simplified diagram of an example event tracking process according to some embodiments. The event tracking of FIG. 3 begins with an initial stimulus as detected by a module 312. In some examples, the initial stimulus of module 312 may be triggered by a request made to module 312 or by a fault condition detected by module 312. Module 312 corresponds to any of the software modules 116-118, 126, 215, 216, and/or 236 and/or hardware module 217 of FIGS. 1 and 2. To support tracking of event A 310, module 312 may register event A 310 with a tracking registry, thus creating a tracking entry associated with event A 310. The tracking registry corresponds to any of the tracking registries 136, 219, 236, 238, and/or 246 of FIGS. 1 and 2.

In order to service and/or handle event A 310, module 312 may perform some of the processing itself and delegate some of the processing to other modules. As shown in FIG. 3, module 312 is delegating some of the processing to modules 322 and 332. Although shown as separate modules, modules 322 and 332 may be the same module. In some examples, modules 322 and/or 332 may each be any of the software modules 116-118, 126, 215, 216, and/or 236 and/or hardware module 217. Module 312 delegates some of the processing to module 322 by initiating a request to module 322. To support tracking of the request made by module 312, module 322 may register an event B 320 with a tracking registry. The tracking registry may be the same or a different tracking registry in which event A 310 is registered. In some examples, the tracking registry in which event B 320 is registered may be any of the tracking registries 136, 219, 236, 238, and/or 246.

Similarly, Module 312 delegates some of the processing to module 332 by initiating a request to module 332. To support tracking of the request made by module 312, module 332 may register an event C 330 with a tracking registry. In some examples, the tracking registry in which event C 330 is registered may be any of the tracking registries 136, 219, 236, 238, and/or 246. In some examples, the tracking registry may be the same tracking registry in which either event A 310 and/or event B 320 is registered and/or some other tracking registry.

When module 322 completes a first portion of the processing requested by module 312, module 322 may close the tracking entry associated with event B 320 by notifying the tracking registry where event B 320 is registered to close the tracking entry, as identified by event B' 324. Module 322 then begins a second portion of the processing requested by module 312 by registering an event D 340 with a tracking registry. The tracking registry may be any tracking registry and need not be the same tracking registry where event B 320 is registered. When module 322 completes the second portion of the processing requested by module 312, module 322 may close the tracking entry associated with event D 340 by notifying the tracking registry where event D 340 is registered to close the tracking entry, as identified by event D' 344.

In order to perform the processing requested by module 312, module 332 may perform some of the processing itself and delegate some of the processing to other modules. As shown in FIG. 3, module 332 is delegating some of the processing to modules 352 and 362. Although shown as separate modules, modules 352 and 362 may be the same module or may even be any one of the modules 312, 322, and/or 332. In some examples, modules 352 and/or 362 may each be any of the software modules 116-118, 126, 215, 216, and/or 236 and/or hardware module 217.

Module 332 delegates some of the processing to module 352 by initiating a request to module 352. To support tracking of the request made by module 332, module 352 may register event E 350 with a tracking registry. The tracking registry may be any tracking registry. When module 352 completes the processing requested by module 332, module 352 may close the tracking entry associated with event E 350 by notifying the tracking registry where event E 350 is registered to close the tracking entry, as identified by event E' 354.

Similarly, module 332 delegates some of the processing to module 362 by initiating a request to module 362. To support tracking of the request made by module 332, module 362 may register an event F 360 with a tracking registry. The tracking registry may be any tracking registry. When module 362 completes the processing requested by module 332, module 362 may close the tracking entry associated with event F 360 by notifying the tracking registry where event E 350 is registered to close the tracking entry, as identified by event F' 364.

When the processing and operations associated with events C 330, E 350, and F 360 are completed and the terminal condition for event C 330 is realized, any one of the modules 332, 352, and/or 362 may close the tracking entry associated with event C 330. This is done by notifying the tracking registry where event C 330 is registered to close the tracking entry, as identified by event C' 334.

Similarly, when the processing and operations associated with events A 310, C 330, and D 340, are completed and the terminal condition for event A 310 is realized, any one of the modules 312, 324, and/or 334 may close the tracking entry associated with event A 310. This is done by notifying the tracking registry where event A 310 is registered to close the tracking entry, as identified by event A' 314.

By using one or more tracking registries to track events A 310, B 320, C 330, D 340, E 350, and F 360, it is possible to obtain a better understanding of a status of each of the modules 312, 322, 332, 352, and/or 362 as they undertake the processing to handle the initial stimulus as detected by module 312. A developer and/or a monitoring system is able to query the one or more tracking registries to determine which, if any, of the events A 310, B 320, C 330, D 340, E 350, and/or F 360 and registered and/or closed. In some examples, by examining the combination of registered and/or closed tracking entries, it may be possible to determine a source of a failure in the processing triggered by the initial stimulus as detected by module 312 and to take appropriate remedial action. The remedial action may include, reissuing a processing request, rebooting and/or restarting one or more of the modules, initiating a data structure dump in one or more of the modules, and/or the like. Thus, when events B 320, D 340, E 350, and F 360 are closed, but events A 310 and C 330 are not, it may be possible to infer that the failure in processing may be in modules 312 and/or 332.

As discussed above and further emphasized here, FIG. 3 is merely an example which should not unduly limit the scope of the claims. One of ordinary skill in the art would recognize many variations, alternatives, and modifications. In some embodiments, other arrangements and combinations of events, modules, and/or registration servers are possible. In some examples, processing may be delegated in any fashion between any of the various modules operating in a computing system.

Figure 4:
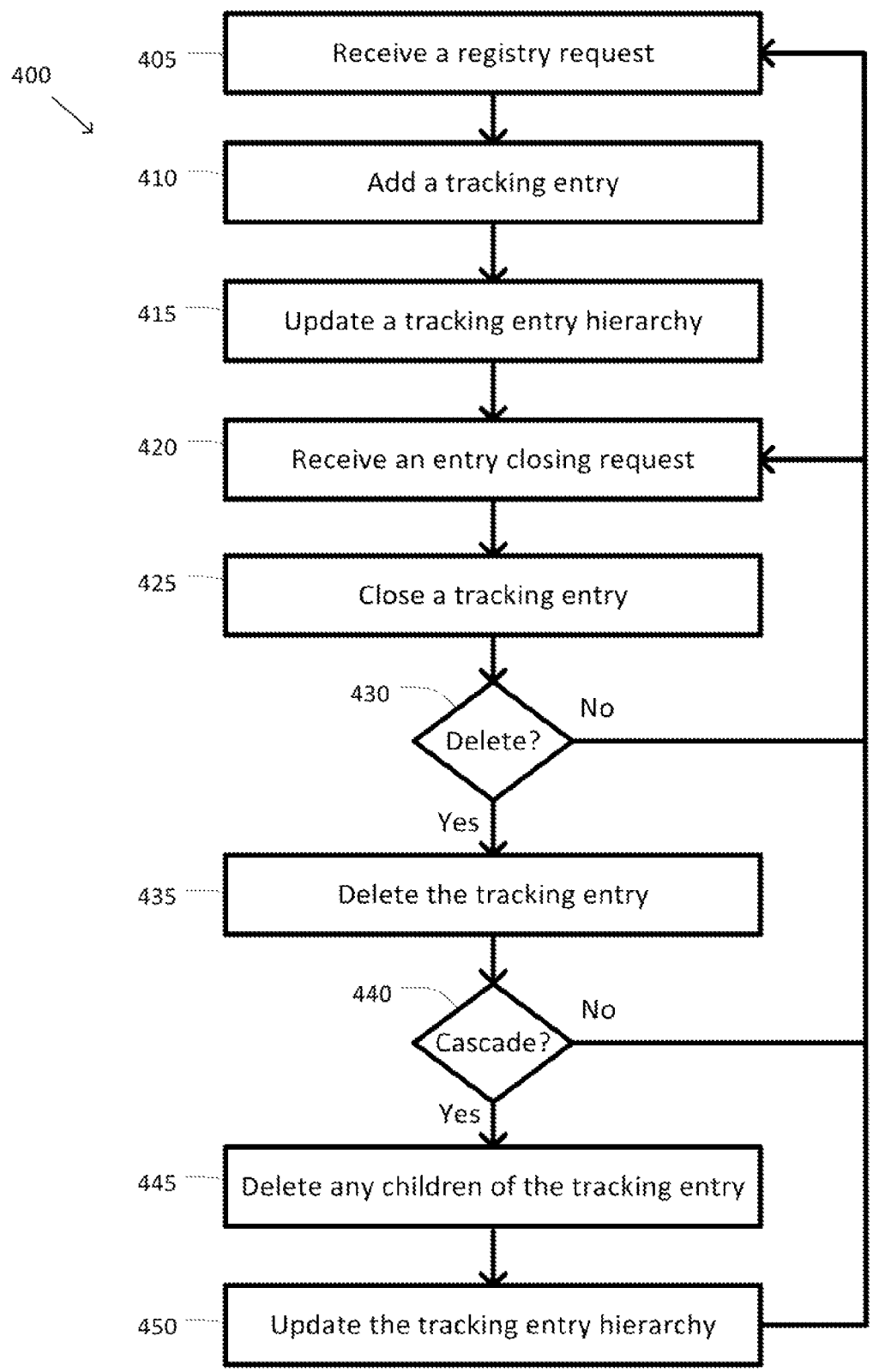
FIG. 4 is a simplified diagram of an example method of event tracking according to some embodiments.

FIG. 4 is a simplified diagram of an example method 400 of event tracking according to some embodiments. One or more of the processes 405-450 of method 400 may be implemented, at least in part, in the form of executable code stored on non-transient, tangible, machine readable media that when run by one or more processors (e.g., the one or more processors of FIGS. 1 and 2) may cause the one or more processors to perform one or more of the processes 405-450.

At a process 405, a registry request is received. A tracking registry may receive the registry request from any module operating in a computing system. In some examples, the tracking registry may be any one of the tracking registries 136, 219, 236, 238, and/or 246. In some examples, the module may be any one of the software modules 116-118, 126, 215, 216, and/or 226 and/or hardware module 217. In some examples, the registry request may be associated with any one of the events A 310, B 320, C 330, D 340, E 350, and/or F 360. In some examples, the tracking request may be received on a registry interface, such as registry interface 137. In some examples, the registry request may be received via an API, a remote procedure call, a web service invocation, receipt of a message, and/or the like.

At a process 410, a tracking entry is added. The tracking entry is created based on information associated with the registry request received during process 405 and then the tracking entry is added to the tracking registry. Depending upon tracking features supported by the tracking registry, the tracking entry may include any number of fields.

Before further discussing the processes of method 400, an example tracking entry 500 will be described. FIG. 5 is a simplified diagram of the example tracking entry 500 according to some embodiments. As shown in FIG. 5, tracking entry 500 may include several fields including an identifier (ID) 505, an open_time 510, a close_time, 515, an expected_close_time, a type 525, a module 530, a parent 535, children 540, a name 545, and/or a state 550.

ID 505 is a field for storing an identifier for the tracking entry. ID 505 uniquely identifies the tracking entry to distinguish it from other tracking entries. ID 505 may uniquely identify the tracking entry for a single tracking registry or may uniquely identify the tracking entry across the various tracking registries in a computing system. In some examples, a value for ID 505 may be included in the registry request received during process 405. In some examples, the value for ID 505 may be generated by the tracking registry or by a separate identifier generating system. In some examples, when the value for ID 505 is not included in the registry request, ID 505 may be returned to the module making the registry request. In some examples, ID 505 may be hashed or otherwise encrypted. ID 505 may be used to index the tracking entry 500, such as by using ID 505 as a key in a key-value pair with the remaining fields of tracking entry 500 forming the value.

Open_time 510 is a field for storing a time stamp indicating when the tracking entry is created and its value may be included in the registry request received during process 405. In some examples, the value for open_time 510 may be generated by the tracking registry. Close_time 515 is a field for storing a time stamp indicating when the tracking entry is closed and may be included in a terminal event, for example, an entry closing request received later during process 425. In some examples, the value for close_time 515 may be generated by the tracking registry. In some examples, close_time 515 may only be used when the tracking entry does not automatically get deleted when the tracking entry is closed.

Expected_close_time 520 is a field for storing when the tracking entry is expected to be closed and its value may be included in the registry request received during process 405. In some examples, the expected_close_time 520 may be used in a determination of whether any processing, operations, and/or event handling associated with the tracking entry may have failed. In some examples, the expected_close_time 520 may be set at a default interval after open_time 510.

Type 525 is a field for storing a type of the tracking entry. In some examples, a value for type 525 may be included in the registry request received during process 405. In some examples, type 525 may be used to encode a storage read and/or a storage write request. In some examples, type 525 may be used during management of the tracking registry to focus on tracking entries associated with only certain types of events.

Module 530 is a field for storing an identifier that identifies the module that initiated the registry request received during process 405 and its value may be included in the registry request. In some examples, the value for module 530 may be determined based on information associated with the registry request. In some examples, the value for module 530 may be an encoding of an Internet Protocol (IP) address and a Transport Control Protocol (TCP) or a User Datagram Protocol (UDP) port number associated with the registry request.

Parent 535 is a field for storing an identifier corresponding to a parent of the tracking entry and its value may be included in the registry request received during process 405. When the tracking entry has no parent, a value for parent 535 may be zero and/or null. Parent 535 will be discussed in further detail with processes 415 and 450. In some examples, when a tracking entry hierarchy is not supported, parent 535 may be omitted from the tracking entry.

Children 540 is a field for storing identifiers corresponding to children of the tracking entry. When the tracking entry is first created, it has no children and a value for children 540 may be zero and/or null. In some examples, children 540 may be updated when the tracking request received during process 405 includes a parent identifier that corresponds to the tracking entry. In some examples, children 540 includes a list of children for the tracking entry. In some examples, children 540 includes a pointer or similar value for identifying a separate data structure identifying the children of the tracking entry. Children 540 will be discussed in further detail with processes 415 and 450. In some examples, when a tracking entry hierarchy is not supported, children 540 may be omitted from the tracking entry.

Name 545 is a field for storing a name and/or a description of the tracking entry, and a value for name 545 may be included in the registry request received during process 405.

In some examples, the value for name 545 may be generated by the tracking registry. In some examples, name 545 may be omitted from the tracking entry.

State 550 is a field for storing a state of the tracking entry. In some examples, possible states include open, closed, and open_beyond_expected_close. In some examples, a value for state 550 defaults to open when tracking entry 500 is created. In some examples, state 550 may be omitted when a special value for close_time 515 may be used to indicate that tracking entry 500 is still open. In some examples, the special value for close_time 515 may be zero and/or null.

As discussed above and further emphasized here, FIG. 5 is merely an example which should not unduly limit the scope of the claims. One of ordinary skill in the art would recognize many variations, alternatives, and modifications. In some embodiments, other fields may be included in the tracking entry to support additional tracking functionality. In some examples, additional fields may be included for sub-typing of tracking entries. In some examples, additional fields related to the module making the registry request may be included.

Referring back to FIG. 4 and the process 410, once the tracking entry is created, it may be added to the tracking registry by being stored in memory allocated to the tracking registry. The memory allocated to the tracking registry may be included in any of the memories 134, 214, 234, and/or 244. In some examples, ID 505 may be used as a hash value when the tracking entry is added to a hash table. In some examples, ID 505 may be used as an index when the tracking entry is added as a record in a database, such as a NoSQL database. In some examples, ID 505 may be used as a key in a key-value pair when the tracking registry stores key-value pairs. The tracking entries may be added to the tracking registry to optimize storage and/or retrieval time. The tracking entries may be added to the tracking registry to optimize an amount of memory used to store each tracking entry.

At an optional process 415, a tracking entry hierarchy is updated. When the tracking registry supports a tracking entry hierarchy, the tracking entry hierarchy may be updated using information found in the registry request received during process 405. In some examples, the registry request may include an identifier for a parent tracking entry. When the identifier for the parent tracking entry indicates that the tracking entry is not associated with a parent, no change occurs to the tracking entry hierarchy. When the identifier for the parent tracking entry indicates that the tracking entry is associated with a parent, the children 535 field of the parent tracking entry is updated to reflect that the tracking entry is a child of the parent tracking entry. Before moving on to process 420, a brief discussion of a tracking entry hierarchy may assist in understanding process 415.

Before completing the discussion of the processes of method 400, an example tracking entry hierarchy 600 will be described. FIG. 6 is a simplified diagram of the example tracking entry hierarchy 600 associated with the event tracking of FIG. 3 according to some embodiments. As shown in FIG. 6, the parent-child relationships between events A 310, B 320, C, 330, D 340, E 350, and F 360 of FIG. 3 are shown in tree form. Tracking entry hierarchy 600 is created through a series of registry requests, such as those received during process 405. Tracking entry hierarchy 600 is initially empty.

When a registry request is received for event A 310, the registry request indicates that a tracking entry associated with event A 310 has no parent. At this point, tracking entry hierarchy 600 includes only a hierarchy node associated with a tracking entry 610, which is associated with event A 310.

When module 312 delegates processing to module 322, module 312 provides module 322 with the ID for tracking entry 610. When module 322 makes a registry request to be associated with event B 320, it supplies the tracking registry with the ID for tracking entry 610 as the parent. The tracking registry creates and adds a tracking entry 620, which is associated with event B 320 during process 410. During process 415, the tracking registry updates tracking entry hierarchy 600 by linking tracking entry 620 as a child of tracking entry 610 and/or tracking entry 610 as a parent of tracking entry 620. In some examples, the linking may be implemented by adding the ID 505 of tracking entry 620 to the children 535 field of tracking entry 610 and/or setting the parent 535 field of tracking entry 620 to the ID of tracking entry 610.

Similarly, when module 312 delegates processing to module 332, module 312 provides module 332 with the ID for tracking entry 610. When module 332 makes a registry request to be associated with event C 330, it supplies the tracking registry with the ID for tracking entry 610 as the parent. The tracking registry creates and adds a tracking entry 630, which is associated with event C 330 during process 410. During process 415, the tracking registry updates tracking entry hierarchy 600 by linking tracking entry 630 as a child of tracking entry 610 and/or tracking entry 610 as a parent of tracking entry 630.

When module 322 makes a registry request to be associated with event D 340, it again supplies the tracking registry with the ID for tracking entry 610 as the parent. The tracking registry creates and adds a tracking entry 640, which is associated with event D 340 during process 410. During process 415, the tracking registry updates tracking entry hierarchy 600 by linking tracking entry 640 as a child of tracking entry 610 and/or tracking entry 610 as a parent of tracking entry 640.

When module 332 delegates processing to modules 352 and 362, module 332 provides modules 352 and 362 with the ID for tracking entry 630. Thus when modules 352 and 362 make their corresponding requests to the tracking registry, they each supply the tracking registry with the ID for tracking entry 630 as the parent. In this way tracking entry hierarchy 600 may be updated to link a tracking entry 650 associated with event E 350 and a tracking entry 660 associated with events F 360 as children of tracking entry 630 and/or to link tracking entry 630 as a parent of both tracking entry 650 and tracking entry 660.

Referring back to FIG. 4, at a process 420, an entry closing request is received. The tracking registry may receive the entry closing request from any module operating in the computing system. Included in the entry closing request is an ID for the tracking entry to be closed. The module may be the same module from which a registry request associated with the ID was received during process 405 or may be a different module from which the registry request associated with the ID was received during process 450. The entry closing request may be received on a registry interface, such as registry interface 137 and may be received via an API, a remote procedure call, a web service invocation, receipt of a message, and/or the like.

At a process 425, the tracking entry is closed. The tracking entry associated with the ID included in the entry closing request received during process 420 is closed by the tracking registry. In some examples, the tracking entry may be closed by setting the state 550 field to closed. In some example, the tracking entry may be closed by setting the close_time 515 field to a time stamp, where the time stamp may be included in the entry closing request or generated by the tracking registry.

At a process 430, it is determined whether the tracking entry should be deleted. In some examples, the tracking entry may not be automatically deleted when the tracking entry is closed because knowing which tracking entries are closed may be helpful in determining a source of a failure when other tracking entries are not closed. Information included with the entry closing request received during process 420 may indicate whether the tracking entry should be deleted. Examples of such information may include configuration settings associated with the tracking registry. When the tracking entry should be deleted, it is deleted using process 435. When the tracking entry should not be deleted, method 400 returns to either process 405 and/or 420 to wait for another registry request and/or another entry closing request.

At a process 435, the tracking entry is deleted. The tracking registry deletes the tracking entry associated with the ID included in the entry closing request received during process 420. The children 540 field of the parent tracking entry of the tracking entry may be updated to remove the tracking entry. When the tracking registry is maintaining the tracking entry hierarchy, process 435 may further include updating the tracking entry hierarchy so that the children of the tracking entry associated with the ID are added to the children 540 field of the parent tracking entry of the tracking entry identified by the parent 535 field. As an example, when tracking entry 630 is deleted, the children of tracking entry 630, tracking entries 650 and 660, become the children of tracking entry 610 because tracking entry 610 is the parent of tracking entry 630.

At an optional process 440, it is determined whether cascading deletes should be used. Cascading deletes may be used when the children of a deleted tracking entry should also be deleted. This may reflect the situation that when a terminal condition for a tracking entry is reached, it may be possible to assume that all the delegated processing is completed as well. The use of cascade deletes may be associated with information included in the entry closing request received during process 420. In other examples, cascading deletes may be used when the tracking entry deleted during process 435 is associated with no parent tracking entry. When cascading deletes are determined, the children of the tracking entry are deleted using process 445. When cascading deletes are not determined, method 400 returns to either process 405 and/or 420 to wait for another registry request and/or another entry closing request.

At an optional process 445, any children of the tracking entry are deleted. The tracking registry uses the tracking entry hierarchy to determine the children of the tracking entry deleted during process 435. The process is then recursively repeated so that any children of the children are also deleted, and so forth. In some examples, this may provide a convenient mechanism for deleting the tracking entries below the deleted tracking entry in the tracking entry hierarchy. As an example, when tracking entry 630 is deleted with cascading deletes, not only would tracking entry 630 be deleted, but tracking entries 650 and 660 would be deleted as well.

At an optional process 450, the tracking entry hierarchy is updated. The tracking registry updates the tracking entry hierarchy to remove the tracking entries deleted during processes 435 and/or 445. Process 450 may not be necessary when the tracking entry hierarchy is maintained using the parent 535 field and/or the children 540 field, or similar, in the tracking entries. Method 400 then returns to either process 405 and/or 420 to wait for another registry request and/or another entry closing request.

The scope of embodiments is not limited to the processes shown in FIG. 4. According to certain embodiments, the method 400 of event tracking can be performed using variations among the processes 405-450 as would be recognized by one of ordinary skill in the art. In some examples, one or more of the processes 415, 440, 445, and/or 450 are optional and may be omitted.

Figure 7:
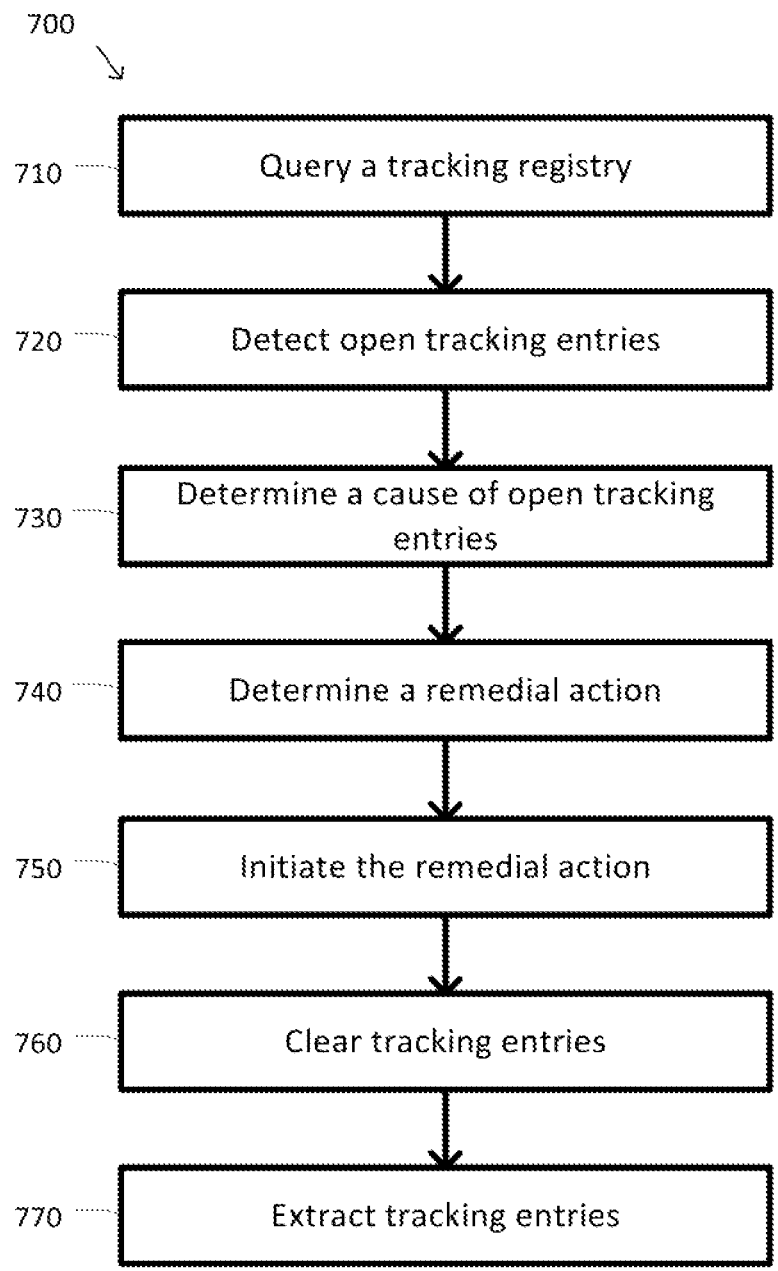
FIG. 7 is a simplified diagram of an example method of event tracking and management according to some examples.

FIG. 7 is a simplified diagram of an example method 700 of event tracking and management according to some embodiments. One or more of the processes 710-770 of method 700 may be implemented, at least in part, in the form of executable code stored on non-transient, tangible, machine readable media that when run by one or more processors (e.g., the one or more processors 132, 142, 212, 232, and/or 242) may cause the one or more processors to perform one or more of the processes 710-770. In some examples, method 700 may be performed, at least in part, using a management module, such as management module 146.

At a process 710, a tracking registry is queried, e.g., using a database query. A developer and/or a monitoring system may query a tracking registry to determine which tracking entries are closed and which tracking entries remain open. The tracking registry may be any of the tracking registries of FIGS. 1 and 2. In some examples, the query may be received by the tracking registry using a management interface, such as management interface 138. In some examples, multiple tracking registries may be queried, and the fields of any tracking entries in the tracking registry may be used as part of the query. The query may use the type 525 field to request information for tracking entries of one or more types. The query may request tracking entries opened before a certain time or tracking entries with a state 550 of open even though the current time is after expected_close_time 520. In some examples, the query may make use of a tracking entry hierarchy to find tracking entries associated with a particular tracking entry.

At a process 720, open tracking entries are detected based on one or more queries of the tracking registry made during process 710. The presence of open tracking entries in the tracking registry suggests that processing for one or more requested services and/or the handling for an event, such as a fault condition, is not yet complete. The presence of the open tracking entries may indicate a failure and/or a defect in the modules performing the requested services and/or event handling. In some examples, the detected open tracking entries are provided to the developer and/or the monitoring system.

At a process 730, a cause of the open tracking entries is determined. The open tracking entries detected during process 720 are examined to determine why the open tracking entries are not closed. Process 730 may involve examining patterns and/or combinations among the open tracking entries. In some examples, the open tracking entries may be open because sufficient time has not elapsed to perform the processing necessary to service the associated request and/or handle the associated event. In some examples, determining the cause of the open tracking entries may further include querying the tracking registry to identify related, but closed tracking entries.

At a process 740, a remedial action is determined based on the cause determined during process 730. Such remedial action may be intended to ensure the completion of the processing and operations for the requested service and/or completion of the desired event handling. The remedial action may include any appropriate action, such as reissuing a processing request to a module, rebooting and/or restarting the module, and extracting and/or dumping one or more data structures of the module. In some examples, the module may be the module identified in the module 530 field of one of the open tracking entries detected during process 720. In some examples, the remedial action may be determined using data analysis, heuristic rules, and/or other artificial intelligence tools. In some examples, management module 146 may provide a list of recommended remedial actions that can be selected by the developer and/or the monitoring system. In some examples, the module may be any of the software and hardware modules of FIGS. 1 and 2.

At a process 750, the remedial action is initiated. For example, management module 146 may provide an interface for initiating the action in the module. The interface may be capable of making a function call to the module using plug-ins, APIs, remote procedure call interfaces, web services interfaces, and/or the like. The interface may additionally be capable of sending network messages to the module. The interface may also be able to generate one or more signals, such as an interrupt, that may be coupled to or transmitted to the module.

At a process 760, tracking entries are cleared. In order to keep a number of tracking entries in the tracking repository from continually increasing, it may be desirable to clear and/or delete one or more tracking entries in the tracking registry. In some examples, injudicious use of cascading deletes may result in closed tracking entries that are no longer relevant and/or useful in supporting process 720-750. Tracking entries registered and/or opened more than a maximum open interval prior to the present may be cleared. In other examples, tracking entries closed more than a maximum closed interval prior to the present may be cleared. The maximum open interval and/or the maximum closed interval may be provided as a parameter to the tracking registry and/or as part of a configuration for the tracking registry. The clearing of tracking entries may occur periodically using a timer-based mechanism, such as a chron job. When a processing request is reissued to a module and/or the module is rebooted and/or restarted, any associated and tracking entries associated with the module may be cleared.

At the process 770, tracking entries are extracted and/or dumped from the tracking registry to support processes 720-750. In some examples, the tracking entries may be extracted to another system for evaluating and/or benchmarking the associated modules.

The scope of embodiments is not limited to the actions shown in FIG. 7, According to certain embodiments, the method 700 of event tracking and management can be performed using variations among the processes 710-770 as would be recognized by one of ordinary skill in the art.

Some examples of nodes 110, 120, 210, and/or 220, workstation 140, and/or registry servers 130, 230, and/or 240 may include non-transient, tangible, machine readable media that include executable code that when run by one or more processors (e.g., one or more processor 112, 122, 132, 142, 212, 222, 232, and/or 242) may cause the one or more processors to perform the processes of methods 400 and/or 600 as described above. Some common forms of machine readable media that may include the processes of methods 400 and/or 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

According to some embodiments, the tracking registry and methods 400 and 700 may be well suited to monitoring and debugging network storage environments. In network storage environments the hardware and software modules that implement storage requests, such as reads and writes, are often distributed across many nodes in a network. As an example, a first module in a first node may initiate a file read operation. Portions of the processing and operations for the file read operation may be delegated to a second module in a file server, which may in turn delegate other portions of a second node where a physical storage device with the requested data is located. A third module in the second node may trigger a read of the physical storage device using a DMA-based hardware module. Once read, the data may be returned to the first node where it is handled by a caching module before being provided to the first module. By using tracking registries, the various modules may make registry requests and entry closing requests that allow for effective monitoring and tracking of the file read operation from the original request by the first module until the read data is received by the first module.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system comprising:
  a registry server, the registry server comprising:
   a memory containing a machine readable medium storing a tracking registry and machine-executable code for performing a method;
  a registry server, the registry server comprising:
   a processor communicatively coupled to the memory, the processor configured to execute the machine-executable code to cause the processor to:
    receive, from a first processing module of a distributed computing system that includes the registry server, a tracking request associated with a first operation that is performed by the first processing module and that is included in processing performed by the distributed computing system in response to a stimulus,
    identify, from the tracking request, first information associated with an event that is handled by the first operation,
    open a tracking entry based on the identified first information,
    add the tracking entry to the tracking registry,
    receive, from a second processing module of the distributed computing system that is separate from the first processing module, a close request associated with a second operation that is included in the processing performed by the distributed computing system and that is associated with completion of the first operation, identify, from the close request, second information associated with a terminal event for the processing that is handled by the second operation, and close the tracking entry based on the identified second information, wherein the tracking request includes a parent identifier associated with a parent tracking entry of the tracking entry, modify a child identifier field of the parent tracking entry to include an identifier of the tracking entry.

2. The system of claim 1, wherein the processor is further configured to:

associate the tracking entry with an identifier; and store the tracking entry in the memory based on information associated with the identifier.

3. The system of claim 2 wherein the processor is further configured to return the identifier to the first processing module.

4. The system of claim 2 wherein the identifier comprises a hash value locating the tracking entry in a hash table.

5. The system of claim 2 wherein the identifier comprises a key identifying a key-value pair storing the tracking entry.

6. The system of claim 2 wherein the identifier comprises an index identifying a data base record storing the tracking entry.

7. The system of claim 2 wherein the processor is further configured to identify the tracking entry from the close request based on the identifier being included in the close request.

8. The system of claim 1, wherein the processor is further configured to close the tracking entry by setting a close time field of the tracking entry based on a time stamp.

9. The system of claim 1, wherein the processor is further configured to delete the tracking entry from the memory after the tracking entry is closed.

10. The system of claim 1, wherein the processor is further configured to:

identify, from a tracking entry hierarchy of the tracking registry, child tracking entries that are children of the tracking entry;

determine that the child tracking entries should be deleted; and based on a determination that that child tracking entries should be deleted:

delete the child tracking entries based on information associated with the tracking entry hierarchy, and update the tracking entry hierarchy based on information associated with the deleted child tracking entries.

11. The system of claim 1, wherein the processor is further configured to:

receive a query associated with the processing;

identify the tracking entry from the query; and transmit, responsive to the query, a list of tracking entries satisfying the query, the list of tracking entries including the tracking entry associated with the first operation.

12. The system of claim 1, wherein the tracking entry includes fields for recording a time when the tracking entry is opened, a type of the tracking entry, and information associated with the first processing module.

13. The system of claim 1, wherein each of the first and second modules are selected from a group consisting of a software module and a hardware module.

14. A method of managing events in a distributed computing system, the method comprising:

receiving a registry request from a first module operating on a first node of the distributed computing system via a registry interface, the registry request being associated with a first operation being handled by the first module;

opening a tracking entry based on information associated with the registry request; storing the tracking entry in a tracking registry;

receiving an entry closing request from a second module operating on a second node of the distributed computing system via the registry interface, the entry closing request being associated with completion of a second operation being handled by the second module;

identify, from the entry close request, second information associated with a terminal event for the processing that is handled by the second operation;

closing the tracking entry based on the identified second information associated with the entry closing request, wherein the registry request includes a parent identifier associated with a parent tracking entry of the tracking entry, and modifying a child identifier field of the parent tracking entry to include an identifier of the tracking entry.

15. The method of claim 14, further comprising:

receiving a query via a management interface; and generating a list of tracking entries satisfying the query that are stored in the tracking registry.

16. The method of claim 14, further comprising:

querying the tracking registry to determine one or more open tracking entries;

determining why a second tracking entry selected from the one or more open tracking entries remains open; and determining a remedial action for correcting a problem associated with a third operation associated with the second tracking entry.

17. The method of claim 16 wherein querying the tracking registry to determine one or more open tracking entries comprises selecting each of the one or more open tracking entries based on an elapsed time since each of the one or more open tracking entries was opened.

18. The method of claim 16 wherein determining why a second tracking entry selected from the one or more open tracking entries remains open comprises examining both open and closed tracking entries.

19. The method of claim 16, further comprising, initiating the remedial action.

20. The method of claim 16 wherein the remedial action is selected from a group consisting of reissuing a processing request, rebooting a module, and restarting a module.

21. The method of claim 14, further comprising clearing one or more third tracking entries in the tracking registry based on a query.

22. The method of claim 14, further comprising extracting one or more second tracking entries from the tracking registry based on a query.

23. A non-transitory machine-readable medium having stored thereon machine-executable code that, when executed by one or more machines comprising a registry server, causes machines to:

receive, from a first processing module of a distributed computing system that includes the registry server, a tracking request associated with a first operation that is performed by the first processing module and that is included in processing performed by the distributed computing system in response to a stimulus;

identify, from the tracking request, first information associated with an event that is handled by the first operation;

open a tracking entry based on the identified first information;

add the tracking entry to the tracking registry;

receive, from a second processing module of the distributed computing system, that is separate from the first processing module, a close request associated with a second operation that is included in the processing performed by the distributed computing system that is associated with completion of the first operation;

identify, from the close request, second information associated with a terminal event for the processing that is handled by the second operation; and close the tracking entry based on the identified second information, wherein the tracking request includes a parent identifier associated with a parent tracking entry of the tracking entry;

modify a child identifier field of the parent tracking entry to include an identifier of the tracking entry.

24. The system of claim 1, further comprising:

a first computing node of the distributed computing system, wherein the first computing node is communicatively coupled to the registry server via a data network and is configured to:

execute the first processing module and thereby perform the first operation, transmit the tracking request to the registry server, and delegate, as part of the processing, the second operation to the second processing module; and a second computing node of the distributed computing system, wherein the second computing node is communicatively coupled to the registry server via the data network and is configured to:

execute the second processing module and thereby perform the second operation, and transmit the close request to the registry server.

25. The system of claim 1, wherein the first computing node is configured to delegate the second operation by performing at least one of: making a function call to the second processing module, invoking a remote procedure call to the second processing module, or initiating an input/output operation involving the second processing module.

26. The non-transitory machine-readable medium of claim 23, further comprising additional machine-executable code that, when executed by the registry server, causes the registry server to:

identify, from a tracking entry hierarchy of the tracking registry, child tracking entries that are children of the tracking entry;

determine that the child tracking entries should be deleted; and based on a determination that that child tracking entries should be deleted:

delete the child tracking entries based on information associated with the tracking entry hierarchy, and update the tracking entry hierarchy based on information associated with the deleted child tracking entries.

* * * * *